Jan. 12, 1932.          LE ROY WOTTRING          1,840,482
                    SPEED GOVERNING MECHANISM
                        Filed Oct. 2, 1929

INVENTOR.
Le Roy Wottring
BY
ATTORNEYS

Patented Jan. 12, 1932

1,840,482

UNITED STATES PATENT OFFICE

LE ROY WOTTRING, OF LORAIN, OHIO

SPEED GOVERNING MECHANISM

Application filed October 2, 1929. Serial No. 893,912.

This invention relates to speed governing mechanisms and particularly to speed governing mechanisms of the friction or brake type.

One of the objects of this invention is to provide an improved governing mechanism by which the speed of a motor such as an electric motor may be maintained constant.

Another object is to provide a speed governing mechanism of which the constant speed is rendered adjustable in an improved manner.

Another object is to provide a combined motor and speed governing mechanism adaptable for driving timing mechanisms such as timing mechanisms for controlling traffic signal lamps.

Another object is to provide, in a combined motor and governing mechanism therefor, a unitary structure of motor armature and governing mechanism.

Another object is to provide, in a combined motor and speed governing mechanism therefor, a unitary structure of motor armature, shaft, governing mechanism and speed adjustment elements.

Another object is to provide a unitary rotor structure for motors and governing mechanism therefor comprising a motor armature, speed governing mechanism, speed adjustment elements and power take-off elements.

Another object is to provide, in a combined motor and speed governing mechanism therefor, a unitary structure comprising a motor shaft upon which are linearly mounted a motor armature, a speed governing mechanism and power take-off and the speed governing mechanism of which is adapted to be adjusted by adjustably moving the shaft axially.

Another object is to provide, in a combined motor and speed governing mechanism therefor, a unitary structure of motor armature, shaft and governing mechanism, wherein the governing speed may be adjusted by bodily moving the motor armature and governing mechanism and shaft in the axial direction of the shaft.

Another object is to provide a speed governing mechanism for motors which will be of simple design, cheap to manufacture and assemble and efficient in operation.

Other objects will be apparent to those skilled in the art to which my invention pertains.

My invention is fully disclosed in the following description taken in connection with the accompanying drawings, in which:—

Figure 1:
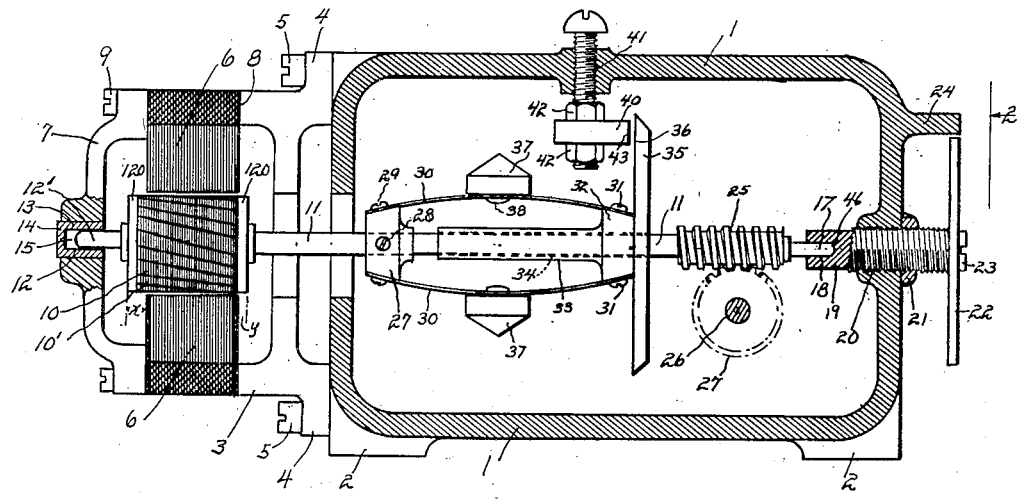
Fig. 1 is a vertical cross-sectional view of the preferred embodiment of my invention.
Figure 2:
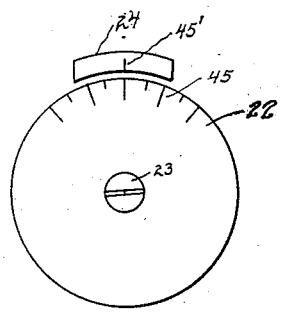
Fig. 2 is an elevational view of a part of Fig. 1 taken from the plane 2 of Fig. 1.

Referring to the drawings, I have shown at 1 a main housing preferably formed from cast metal. The housing 1 may have feet 2 by which it may be supported and by which it may be mounted in suitable relation to other apparatus with which it may be operatively associated. The housing 1 may be made in two or more pieces to entirely enclose the parts therein, which are to be described, and the pieces of the housing 1 may be sealedly connected together in any preferred manner well known in this art to seal the contents of the housing 1 to retain lubricant therein, etc.

Mounted on the left hand end of the housing 1, as viewed in the drawings, is a motor frame 3 provided with feet or flanges 4—4 by which through the agency of screws 5—5 the frame 3 is secured to the housing 1.

In the frame 3 is supported an electric motor of any known or suitable construction. The details of the motor are not deemed essential to be described herein since they form no part of the present invention. For this reason therefore, I have shown only a pair of field poles 6—6 of laminated iron; an end frame member 7, between which and a shoulder 8 on the frame 3, the pole pieces 6—6 are clamped to support them as by means of screws 9; an armature 10 rotatable within the pole pieces 6—6; a shaft 11 for the armature; and a bearing 12 for one end of the armature shaft.

The armature 10 is preferably rigidly secured upon the shaft 11 by press fitting or in any of the well known methods and may, as indicated, be of the well known type comprising a plurality of disk laminations 10' clamped between end plates 120—120.

The shaft is preferably reduced at its free end as at 12' and rotates in a sleeve bearing element 13 closed at its outer end 14. A clearance space 15 is provided between the end of the reduced portion 12' and the closed end 14 of the bearing to permit end wise or axial adjustment of the shaft 11 in the bearing.

The shaft 11 extends axially into the housing 1 and passes horizontally through the housing, terminating in another reduced portion 17 on its other extreme end which reduced portion 17 has bearing support in a corresponding bore 18 in a screw threaded bearing 19 adjustably threaded into the housing 1 as at 20 and adapted to be fixed at any adjusted position by a lock nut 21. The threaded bearing 20 extends axially outwardly through the housing 1 and is provided on its outer end with a transverse circular plate 22 secured thereon by a screw 23. By means of graduations 45 on the disk 22 and a zero graduation 45' on a lug 24 projecting from the housing 1, the rotative adjustment positions of the screw threaded bearing 20 and therefore the axially adjusted positions thereof may be read and determined for a purpose to be described.

Formed on or secured to the shaft 11 in any suitable manner is a driving worm 25. Mounted in the housing 1 in any suitable bearing, not shown, is a shaft 26 carrying a worm wheel 27 meshed with the worm 25, and the shaft 26 may be projected out of the housing 1 through suitable bearings therein, not shown, to transmit power from the worm 25 to drive mechanisms which it is desired to have driven by the motor. If desired, other gearing within the housing 1 may be provided to step up or step down the rotational velocity of the worm 25.

To govern or control to a substantially constant value the velocity of the shaft 11, the following governing mechanism is provided. Upon the shaft is secured a head 27 as by a set screw 28. The head is preferably conical or pyramidal and has secured on its sloping sides as by screws 29, a plurality, such as two, flat springs 30, one end of each spring being secured to the head 27 and the spring ranging axially of the shaft and secured at its other end as by screws 31 to a head 32 similar to the head 27.

The head 32 has an axially ranging extension 33 thereon. The extension 33 and head 32 are bored out as at 34 to have sliding fit on the shaft 11 which passes axially therethrough. Secured to the head 32 in any suitable manner is a disk 35 having a planular face 36 at right angles to the shaft 11. Mounted on each of the springs 30 in any suitable manner as by rivets 38 and substantially mid-way between the ends of the springs 30 are centrifugal weights 37.

In the operation of the governing mechanism thus far described, it will be apparent that upon rotation of the shaft 11, the head 27 rotating with the shaft will cause the springs 30 and weights 37 to rotate around the axis of the shaft, and the latter by centrifugal force will move outward radially and draw the head 32 toward the head 27, the extension 33 guiding the movement of the head 32; and the disk 35 will move with the head 32 axially along the shaft, and the extension 33 will maintain the planular face 36 of the disk 35 in a plane at right angles to the axis of the shaft.

Supported by a wall of the housing 1 is a brake shoe 40, in position to be engaged by the planular face 36 of the disk 35 when the latter moves, as above described. The shoe 40 may be composed of any suitable material such as felt, leather or the like, and may be supported in any suitable manner. The support for the shoe 40 illustrated comprises a stud 41 adjustably threaded in the wall of the housing 1 and provided with a pair of clamp nuts 42 between which the shoe 40 is clamped. The radial position of the shoe 40 with respect to the disk 35 may be adjusted by means of the threaded stud 41.

In operation, the axial movement of the disk 35 due to rotation of the shaft 11 will bring the planular face 36 into contact with a suitable surface 43 on the shoe 40 and the friction thereby generated will tend to retard the rotation of the disk 35 in a well known manner, tending to reduce the speed thereof. A reduction of speed of the disk 35 will reduce the speed of the shaft 11 and permit the springs 30 to retract the weights 37 and thus cause the disk 35 to tend to move axially away from the shoe 40 thus tending to permit its speed to increase again. By this action the speed of the disk 35 and shaft 11 is maintained constant and power transmitted from the worm 25 to driven apparatus will be at a constant speed, as will be understood.

To adjust the constant speed thus attained, the threaded bearing 20 may be screwed toward the left or toward the right axially and will have the effect of increasing or decreasing respectively the friction between the disk 35 and shoe 40 and thus will cause the governing mechanism, as above described, to regulate to a constant lower or higher speed respectively. The graduated scale 45 on the disk 22 may be calibrated in terms of speeds so that the speeds of the motor may be determined or indicated as the bearing 20 is adjustably rotated.

In the device above described, there is a axial or end wise thrust of the shaft 11 toward the right and this is taken up by the extreme end 46 of the reduced portion 17 of the shaft engaging the bottom of the bore 18 in the bearing portion 19. By means of said end thrust, the governing device above described is caused to govern at a high degree of accuracy because of the elimination of any tendency of the shaft to float axially, and I may provide any desired degree of end thrust for this purpose by the following means.

The worm 25 may be threaded right hand or left hand in conjunction with its direction of rotation to exert thrust toward the right as illustrated. Also, by constructing the armature 10 in relation to its fields 6—6 it may exert an end thrust in the right hand direction as illustrated, one means being to project the armature 10 axially out of the enclosing field poles a greater distance at its left end as at $x$ than on its right end as at $y$. Also, by positioning the shoe 40 on the left hand side of the disk 35, its engagement with the disk 35 will react to thrust the disk 35 toward the right.

It is one of the important advantages of my invention that the armature 10, governing mechanism and worm 25 may all be mounted on the shaft 11 to form a unitary structure to facilitate manufacture and assembly operations and that the speed adjustment of the governing mechanism may be obtained by simply moving the entire shaft assembly, thus constructed, axially, one of the shaft bearings being provided to take up axial end thrust and the other being provided with clearance to permit axial movement for these purposes.

My invention is not limited to the exact details of construction shown and described, since my invention may be embodied in other and various structures without departing from the spirit of my invention or sacrificing its advantages.

I claim:

1. In a speed governing mechanism, a rotatably mounted shaft, means for rotating the shaft, and means for regulating the speed of rotation of the shaft to a substantially constant value, said means including an end thrust stop for the shaft, a rotary element mounted to rotate with the shaft and axially movable thereon, centrifugal means for moving the rotary element axially of the shaft in response to variations of shaft speed and a brake element engageable by the rotary element upon axial movement of the element in one direction, and means for adjustably varying said constant speed including operable means for adjustably moving said stop axially, and indicating means for determining the adjusted position of the stop.

2. In a speed governing mechanism, a rotatably mounted shaft, means for rotating the shaft, a worm on the shaft adapted to transmit power to mechanism to be driven thereby, means for maintaining substantially constant the rotational velocity of the shaft, said means including an end thrust stop for the shaft, a rotational element mounted for rotation with the shaft and axially movable thereon, centrifugal means for moving the rotational element axially in response to variations of shaft velocity, a brake shoe adapted to be frictionally engaged by the rotary element upon axial movement thereof in one direction, the lead angle of said worm being in the direction to cause the worm when transmitting power to exert an end thrust on the shaft toward said stop, and means for adjustably changing said shaft velocity including operable means for adjustably moving the shaft and worm bodily axially and indicating means for determining the adjusted position of the shaft.

3. In a speed governing mechanism, a motor shaft, a motor rotor thereon, a motor stator, the shaft being mounted for rotation and for axial movement, an end thrust stop for the shaft, means for regulating the shaft speed to a substantially constant value including a rotary element mounted for rotation with the shaft and axially movable thereon, a centrifugal means for moving the rotary element axially of the shaft in response to speed variations of the shaft, a brake shoe engageable by the rotary element upon movement thereof in one direction axially and means for selectively varying the said constant speed including operable means for moving said end thrust stop in the axial direction of the shaft and means for indicating the adjusted position of the shaft.

4. In a speed governing mechanism, a rotary shaft, a motor rotor on the shaft, a motor stator cooperating therewith to rotate the shaft, the shaft being supported for rotational and axial movement, means for regulating the variations of shaft speed, including a rotary element rotatable with the shaft and movable axially thereon, centrifugal means for moving the rotary element axially, a shoe engageable by the rotary element by movement thereof axially in one direction and means for selectively varying the velocity of the shaft including operable means for bodily moving the shaft axially and means for indicating the axial position of the shaft.

5. In a speed governing mechanism, a motor shaft, a motor rotor on the shaft, a motor stator cooperating therewith to rotatably drive the shaft, a worm on the shaft for transmitting power therefrom, the shaft being mounted for rotation and for movement axially, an end thrust stop for the shaft, means for regulating the velocity of the shaft to a substantially constant value, said means including a rotary element rotatable with the shaft and axially movable thereon in response to variations of shaft velocity, a shoe engageable by the rotary element upon axial movement thereof in one direction, the shaft being adapted to be held in engagement with said end thrust stop by the joint reaction of the motor rotor on its stator, the reaction of the shoe on the rotary element and the reaction of said worm, and means to selectively vary said constant speed, said means including operable means for adjustably moving said end thrust stop in the axial direction of the shaft and indicating means for indicating the adjusted axial position of the shaft.

6. In a speed governing mechanism, a rotatably mounted shaft, means for rotating the shaft, and means for regulating the speed of rotation of the shaft to a substantially constant value, said means including a rotary element mounted to rotate with the shaft and axially movable thereon, centrifugal means for moving the rotary element axially of the shaft in response to variations of shaft speed and a brake element engageable by the rotary element upon axial movement of the element in one direction, and means for adjustably varying said constant speed including a rotatable screw means for adjustably moving the shaft bodily in the direction of its axis and an indicator movable with the screw for indicating its rotative position.

In testimony whereof I hereunto affix my signature this 9th day of September, 1929.

LE ROY WOTTRING.